United States Patent [19]

Randolphi

[11] 4,429,549

[45] Feb. 7, 1984

[54] ICE-CREAM FREEZER

[76] Inventor: Peter P. M. Randolphi, P.O. Box 399, Gormley, Ontario, Canada, L0G 1L0

[21] Appl. No.: 247,591

[22] Filed: Mar. 25, 1981

Related U.S. Application Data

[63] Continuation-in-part of Ser. No. 123,033, Feb. 20, 1980, abandoned.

[51] Int. Cl.³ .............................................. A23G 9/00
[52] U.S. Cl. ...................................... 62/342; 62/381; 62/438
[58] Field of Search ................. 62/342, 343, 136, 381, 62/438; 417/426

[56] References Cited

U.S. PATENT DOCUMENTS

| | | | |
|---|---|---|---|
| 1,987,258 | 1/1935 | Kinzey | 62/136 X |
| 2,204,382 | 6/1940 | Romanski | 62/342 X |
| 3,188,826 | 6/1965 | Carpigiani | 62/136 |
| 3,452,555 | 7/1969 | Thurman et al. | 62/342 |
| 3,952,538 | 4/1976 | Warlick | 62/342 |
| 3,958,968 | 5/1976 | Hosaka | 62/343 |
| 4,179,904 | 12/1979 | McClenny | 62/342 |
| 4,205,535 | 6/1980 | Maurer | 62/342 |

*Primary Examiner*—William E. Tapolcai
*Attorney, Agent, or Firm*—Ridout & Maybee

[57] ABSTRACT

A domestic ice-cream maker has a vertical cylindrical evaporator flanked by other parts of a refrigeration unit and a drive motor. A freezing support is removably located in the evaporator and a paddle in the freezing container is connected to the drive motor by a drive in a hinged lid covering the evaporator. The support is locked in place by freezing of moisture between it and the evaporator and released by a defroster associated with the evaporator which melts the moisture when ice-cream making is completed. The evaporation coil is situated in the space between inner and outer cylindrical vessels, the space being filled with a heat exchange liquid. The material being frozen may be aerated by providing air passages exiting at the trailing edges of the paddle adjacent the bottom of the container.

11 Claims, 7 Drawing Figures

ICE-CREAM FREEZER

REFERENCE TO RELATED APPLICATION

This application is a continuation-in-part of my copending application Ser. No. 123,033, filed Feb. 20, 1980 and now abandoned.

FIELD OF THE INVENTION

This invention relates to self contained ice-cream freezers, intended primarily for domestic use.

BACKGROUND OF THE INVENTION AND PRIOR ART STATEMENT

Small ice-cream freezers have been of two main types, those having a vertical mixing axis in a vertical cylindrical freezing chamber, and those having a horizontal cylindrical freezing chamber and mixing axis. The mixing axis of the latter type, which is primarily found in commercial installations, introduces a substantial amount of air into the ice-cream producing a product which has a different character from ice-cream produced by methods which do not introduce substantial amounts of air into the mix. Other factors affecting the quality and texture of ice-cream are the freezing temperature, the rate of conduction of heat from the mix during freezing, and the rate of mixing, since these influence the size and character of the ice crystals formed in the mix during freezing. It is widely considered that the best quality ice-cream is produced in the traditional type of ice-cream maker in which the mix is subjected to the action of a hand cranked paddle in a galvanized steel vessel surrounded by a salt-and-ice mixture. The relatively slow, gentle churning action, the stable freezing temperature, and the good conduction of heat from the salt and ice freezing mixture to the ice-cream mix combine to provide ideal freezing conditions. On the other hand, the freezing mixture is messy and corrosive, it requires substantial quantities of ice and salt, and the apparatus is cumbersome, slow and manually operated.

In consequence, various attempts have been made to provide modernized versions of this type of ice-cream maker so as to overcome its disadvantages. One approach has been to provide a vertical freezing vessel with an electrically powered paddle, the entire apparatus being placed inside a domestic freezer. Recent examples of patents relating to such apparatus are U.S. Pat. No. 4,070,957 (Korekawa et al) and No. 4,092,835 (Tanguy et al). Korekawa directs himself to reducing one of the main disadvantages of such apparatus, i.e. it depends on air convection to conduct heat from the freezing chamber and the freezing process is thus undesirably slow, from the point of view both of obtaining acceptably rapid operation and obtaining optimum product quality. Tanguy et al utilize an annular freezing chamber, presumably partly with a view to increasing the heat exchange surface of the freezing chamber and thus speeding up freezing. Tanguy et al also address themselves to another problem of such freezers—that of preventing paddle overload as the product freezes since the apparatus clearly has to be able to operate without direct supervision.

In order to obtain freezing times short enough for ice-cream to be obtained of good quality and without excessive advance notice, the present applicant believes that the apparatus must contain its own refrigeration means, and proposals have in the past been made for such self contained apparatus. A first such proposal is contained in U.S. Pat. No. 3,452,555 (Thurman) which provides an arrangement which seeks to overcome most of the problems discussed above in an apparatus which includes a built-in compressor type refrigeration unit, a freezing vessel surrounded by an evaporator coil, and a motor driven paddle rotatable in a vertical mixing vessel. Unfortunately, the resulting assembly is quite complicated, and a good deal of assembly and disassembly is required to remove and insert the freezing vessel containing the ice-cream mix. In fact, in the preferred embodiment, the evaporator coil is formed in two hinged parts which are clamped together around the freezing vessel, provision being made to unclamp and separate the parts to allow removal of the freezing vessel. Not only does this necessarily make the design of the evaporator coil complex and expensive, but it is also difficult to provide efficient insulation to the parts, and to provide uniform heat transfer to the freezing vessel. Thurman does briefly disclose an alternative embodiment without a split evaporator coil, but does not discuss how the freezing vessel is to be removed from the container.

In U.S. Pat. No. 3,952,538 (Warlick), the inventor overcomes the problem of removing the freezing vessel by giving both it and the evaporator unit a coned shape and rotating the freezing vessel bodily using a bottom drive. This approach, while overcoming the problem of removing the container once its contents are formed, severely reduces and renders somewhat erratic the rate of heat transfer between the evaporator and the container, whilst the drive to the vessel must be carefully designed to avoid damage from condensation accumulating or melting into the bottom of the evaporator chamber. The gap between the freezing container and the evaporator must be large enough in practice to prevent the two parts from freezing together as soon as the motor stops. To the best of applicant's knowledge no such integrated ice-cream maker has achieved commercial success on the domestic market.

SUMMARY OF THE INVENTION

The present invention is directed to providing an ice-cream freezer for domestic use which will simulate as closely as possible the performance of an old-fashioned ice and salt ice-cream maker, while being quicker, cleaner and easier to use, economical to manufacture, and small in bulk.

It is one object of the invention to provide an integrated apparatus for preparing ice-cream and other confections in which the frozen confection can be readily introduced into the apparatus and removed after use whilst maintaining excellent heat exchange between the evaporator and the container. This is achieved by relying on the freezing of moisture such as condensation to lock a support for the confection in place within the evaporator during freezing, and providing a defrosting device to release this lock.

According to the invention, there is provided apparatus for preparing ice-cream and other frozen confections comprising an integral refrigeration unit, a vertical cylindrical freezing chamber, paddle means removably located for rotation within the freezing chamber about its vertical axis, and a motor rotating the paddle means, wherein a removable disc-shaped support for the frozen confection is provided resting on the bottom of the freezing chamber and locked thereto during operation of the refrigeration unit by freezing of moisture between the support and the chamber whereby the paddle means rotate relative both to the chamber and the support, wherein selectively operable freezing and defrosting elements are in thermal contact with the freezing chamber whereby the confection may be frozen and thereafter the frozen moisture locking the support to the chamber may be melted to release the support, and wherein means are provided to enable the support and the paddle means to be lifted from the freezing chamber as a unit.

An advantage of the provision of the defrosting device is that, if suitably thermostatically controlled, it enables the apparatus to be used also as a yogurt maker.

Operation is further simplified by using a lid of the apparatus to house a drive connecting a motor alongside the evaporator to a paddle in the container. The drive is thus automatically disconnected as the lid is opened, whilst the location of the motor and the refrigeration apparatus alongside the evaporator provides a compact low profile apparatus, in contrast to the tall shape of known integrated vertical ice-cream makers.

The freezing chamber is preferably constructed as a double walled vessel, an evaporator coil being sandwiched in the space between the walls and thermally coupled thereto by a heat exchange liquid. This avoids the necessity for extensive metallic bonds between the coil and the inner wall of the evaporator, with the advantages that the latter may be made of stainless steel without introducing assembly problems, and is not subjected to distortion such as might occur were it necessary to weld or solder the evaporator tube to the inner wall. This in turn means that the profiles of evaporator can be maintained more accurately, allowing a more rapid transfer of heat even when the support is part of an inner container fitting snugly within the freezing chamber. The heat exchange liquid not only provides uniform heat transfer from the evaporator surface, but if suitably selected helps prevent local cold spots by freezing itself. Since the freezing process is quite short, this freezing of the heat exchange liquid can provide a significant buffering effect which helps to keep the freezing temperature constant. A suitable non-toxic liquid is a mixture of propylene glycol and water.

Although it is generally considered that vertical axis ice-cream machines are suitable only for making traditional non-aerated ice-cream, I have found that "soft" ice-cream and other aerated frozen confections can be made by introducing air passages into the paddle means so that cavitational forces developed during rotation of the paddle means draw air into the mixture.

Further features of the invention will become apparent from the following description of a preferred embodiment.

IN THE DRAWINGS

DESCRIPTION OF THE PREFERRED EMBODIMENT

Figure 1:
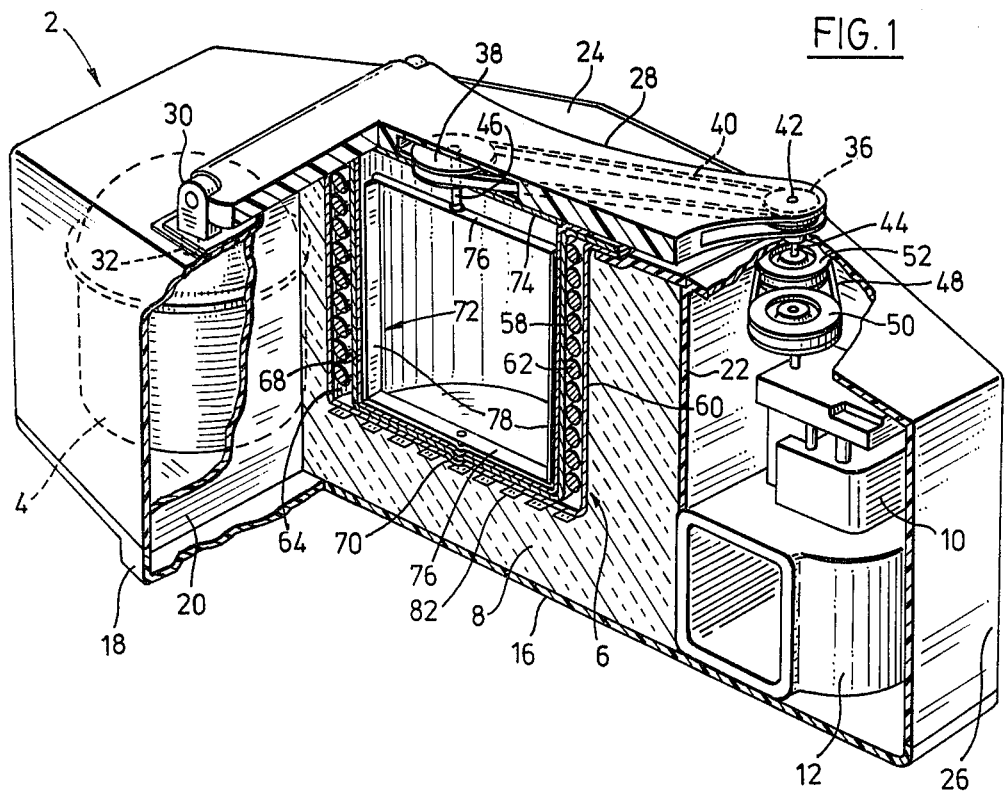
FIG. 1 is a perspective view of an ice-cream freezer in accordance with the invention, partially cut away to show the internal construction.
Figure 4:
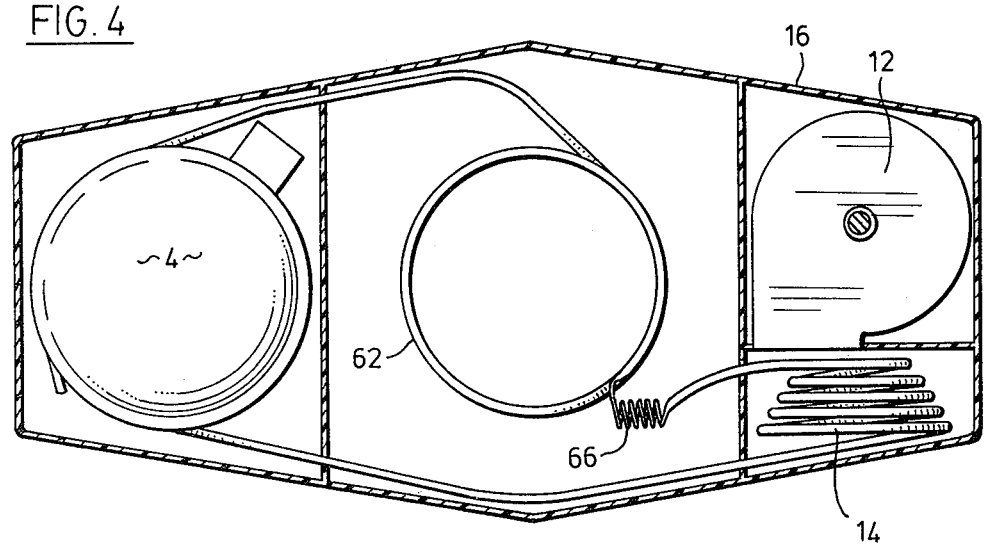
FIG. 4 is a simplified plan view of the body with its upper panels removed, showing the layout of the refrigeration circuit.
Figure 2:
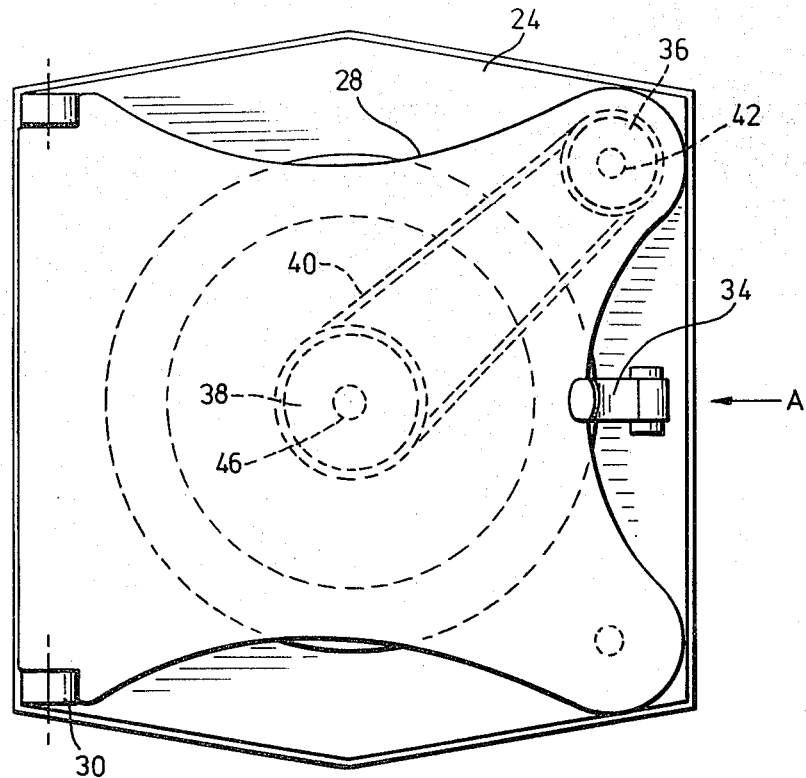
FIG. 2 is a plan view of the lid of the freezer and an associated body panel.
Figure 3:
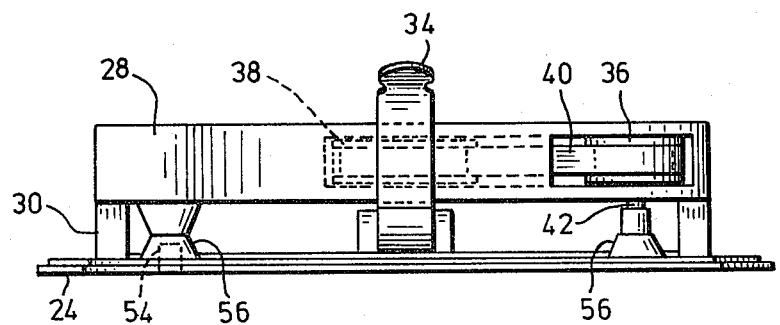
FIG. 3 is an elevational view of the lid and its associated panel from the direction of arrow "A" in FIG. 2.

The drawings show an ice-cream freezer having a moulded synthetic plastic body 2 defining three main compartments, a left-hand (as seen in FIG. 1) compartment containing an electrically powered refrigerant compressor unit 4, a central compartment containing a vertical cylindrical freezing chamber in the form of an evaporator unit 6 surrounded by insulation 8, and a motor compartment containing a drive motor 10, a fan 12, driven by the motor, and a condenser coil 14 (see FIG. 4) cooled by air from the fan, which is drawn through the bottom of the compartment and exhausted through the side of the compartment. The body is moulded in three main portions, the first forming a base 16 with supporting feet 18, and upstanding walls 20 and 22 forming partitions between the compartments. The second portion is a panel 24 which supports the evaporator unit 6 between the walls 20 and 22. The third portion 26 drops over the other two portions and encloses the sides of the body and the tops of the two end compartments. This last portion is only installed after the apparatus has been assembled and tested, after which the free space in the central compartment around the evaporator unit is filled by injecting a foamable synthetic plastic material such as polyurethane which on foaming both forms the insulation 8 and bonds together the evaporator and the various parts of the body into an integral unit.

The body panel 24 carries a hinged moulded lid 28 whose hinges 30 are secured to the panel by spring loaded fasteners 32. The lid is fastened in a closed position by a releasable spring latch 34 and incorporates a belt drive comprising pinions 36 and 38 and a toothed belt 40, the pinions each having splined sockets 42 which when the lid is in the closed position engage the splined ends of shafts 44 and 46. The shaft 46 is driven by the motor 10 through a toothed belt 48 and pinions 50, 52. Thus when the lid is closed, a driving connection is established between the motor 10 and the shaft 46. The spring fasteners 32 assist in obtaining proper engagement of the shafts with the splined sockets as the lid closes. Closure of the lid also causes closure of a switch 54, which like the shaft 44 projects through a raised stud 56 in the panel 24 to provide some protection against ingress of moisture.

The evaporator 6 comprises spaced inner and outer metal vessels 58, 60 with closed bottoms, a copper evaporator coil 62 being wound between the vessels, the remaining space being filled with a heat exchange medium 64 such as, preferably a 50/50 mixture by weight with water of inhibited propylene glycol. A suitable non-toxic preparation for this purpose is sold under the trade mark DOWFROST by the Dow Chemical Company. At least the inner vessel 58 should be of stainless steel so as to provide a freezing chamber with a smooth hygienic corrosion resistant inner surface. The presence of the heat exchange fluid obviates the necessity for metallurgically bonding the evaporator coil to the inner vessel, making the use of stainless steel for this component more practicable and avoiding heat distortion of its inner surface. The evaporator coil 62 is connected in known manner to receive refrigerant via an expansion valve 66 from the condenser coil 14 which in turn receives compressed refrigerant from the compressor 4 which receives refrigerant vapour from the evaporator coil. The heat exchange medium, if suitably selected is believed to ensure a uniform temperature at the inner surface of the evaporator inner vessel, both by assisting in the uniform conduction of heat from the surface of the vessel, but also by preventing excessive local cooling by freezing locally and thus giving up latent heat or fusion. The overall cooling effect is very similar to that achieved by a water and salt freezing mixture, although a lower temperature is achieved which provides a shorter freezing time. Within the inner evaporator vessel is a removable support for the ice-cream which in the embodiment shown in FIG. 1 forms the bottom 92 of a separate freezing container 68 of very slightly smaller dimensions than the freezing chamber formed by the evaporator so that the container is a quite snug but free fit within the evaporator. The freezing container has a sidewall with an out-turned top flange 69 by means of which ice-cream supported on the disc-shaped bottom of the container can be lifted out of the evaporator. The flange also helps to prevent ice-cream mix from penetrating between the evaporator and the freezing container, which is also of stainless steel. A dimple 70 in the bottom of the freezing container locates a bottom pivot of a removable paddle unit 72 which is located at its top end by the shaft 46 and a removable lid 74 closing the top of the freezing container and through which the shaft 46 passes. The paddle unit comprises cross members 76 supporting blades 78 which are angled slightly so that their leading edges are almost scraping the walls of the freezing container whilst the trailing edges are slightly spaced from the walls.

Figure 6:
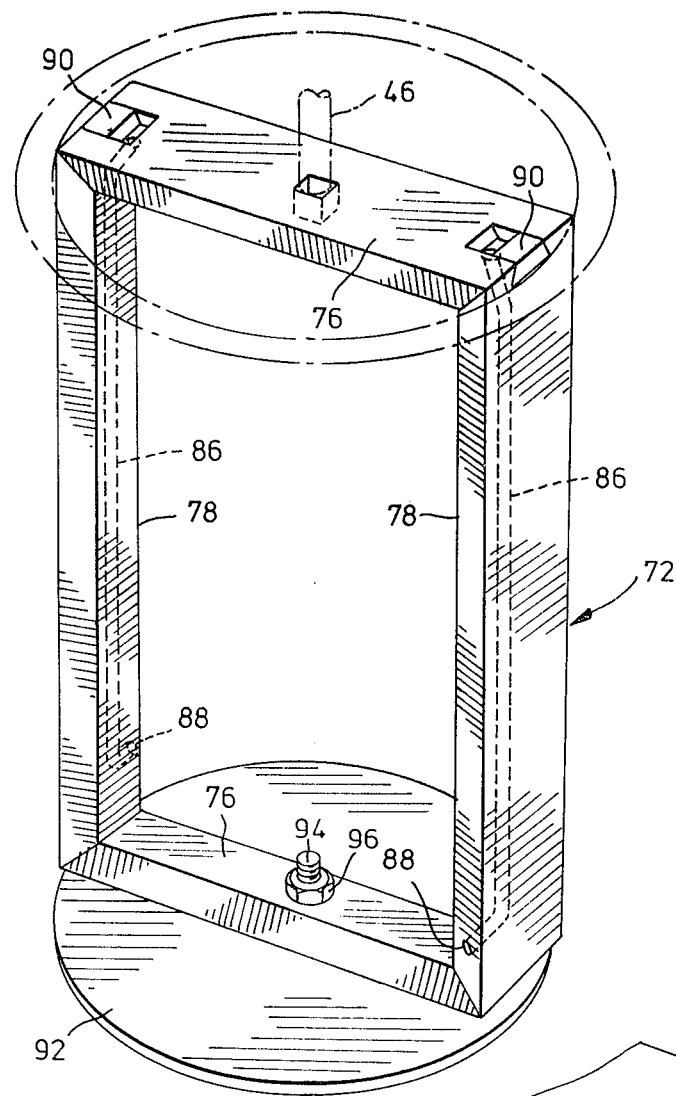
FIG. 6 is a perspective view of a preferred embodiment of paddle means.
Figure 7:
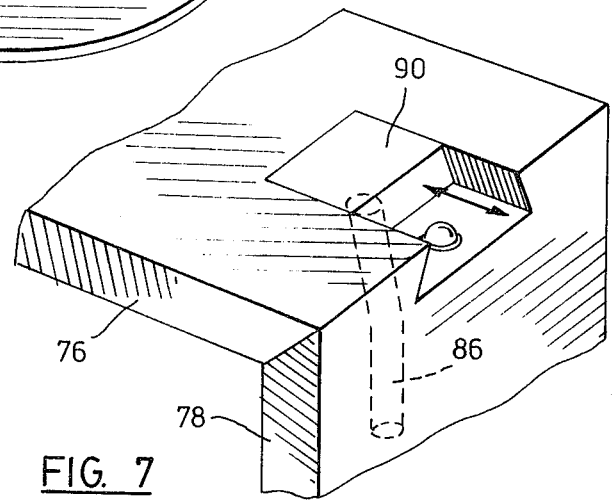

Referring now to FIG. 6, an alternative form of paddle unit 72 is shown having features which enable two main objectives to be achieved. Whilst the unit has cross members 76 and blades 78 as previously described, the blades 78 have air passages formed by drillings 86 leading to exit orifices 88 in the trailing portions of the blades. As the paddle unit rotates in the mix, the cavitational forces set up adjacent the trailing portions of the blades draws air down the drillings and into the mix so as to aerate the latter. It is found that in a typical case, and starting with the freezing chamber formed within the inner evaporator vessel 60 about one third full of mix, about two and a half times the volume of finished ice-cream can be obtained. This aerated product will be similar to the "soft" ice-cream commonly made in horizontal machines. The degree of aeration can be controlled or aeration can be eliminated by wholly or partially shutting off the drillings 86. One exemplary means for doing this is shown in FIG. 6, in which slide valves 90 may be used to shut off one or both drillings, so enabling a single unit to act as a unit with two, one or no drillings.

The second feature shown in FIG. 6 is the replacement of the freezing container 68 with a support in the form of a simple disc 92 releasably secured by a pivot 94 and a nut 96 to the centre of the lower cross member 76. The main purpose of the freezing container 68 is to enable the frozen ice-cream to be removed from the machine. However, since the ice-cream is by then solid, it no longer requires the support of the container side walls during removal, and adequate support is provided by the disc 92 with forces being applied through the paddle unit 72 and the pivot 94 to lift the frozen block of ice-cream out of the evaporator. The heating coil 82 may be used to release the disc 92 from the bottom of the freezing chamber as when the container 68 is used.

The exposure of the side walls of the ice-cream block means that the ice-cream is much easier to serve or otherwise release from the paddle, the disc 92 is much cheaper than the container 68, and the mix is in much more intimate and consistent contact with the evaporator during freezing, thus improving performance and making the dimensional tolerances of the inner evaporator vessel less crucial.

Since the paddle unit of FIG. 6 is of relatively cheap and simple construction, several may be used with one machine to make successive batches of ice-cream. In order to reduce the cost of the unit still further, the shaft 46 may be fast to the pulley 38 rather than the unit 72. The nut 96 permits the disc 92 to be removed for cleaning.

Figure 5:
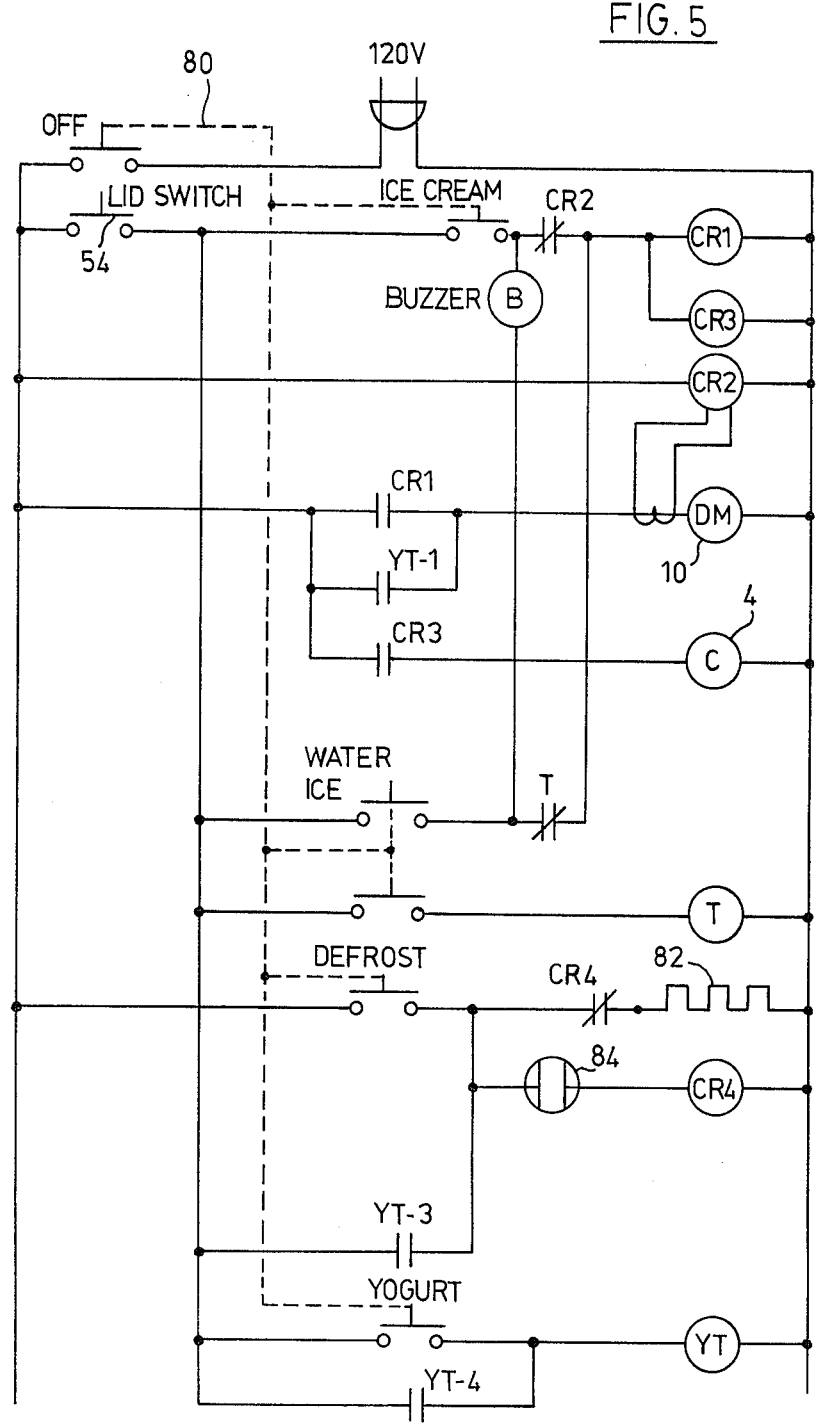
FIg. 5 is an electrical schematic diagram of the freezer.

The electrical circuit of the apparatus is shown schematically in FIG. 5. Primary control of the apparatus is exercised by means of a multiple position switch 80 having an OFF position, and alternate ON positions, namely a momentary contact DEFROST position, and operating positions denoted ICE CREAM, WATER ICE and YOGURT, all of which operative positions conrol switch contacts in series with the switch 54 so that they can only become effective when the lid 28 is closed. Further features of the electrical circuit will be best understood by reference to the following description of the operation of the apparatus.

In operation, and assuming that ice-cream is to be prepared in a container 68, an appropriate ice-cream mix is made up and placed in the freezing container 68, the latter being filled to a level marked on the container, which allows for expansion of the mix during freezing. The paddle 72 is then inserted so that its bottom pivot engages the dimple 70 and the lid 74 is applied so as to locate the shaft 46. If a disc 92 is used in place of the container 68, the paddle and disc are inserted in the inner vessel 60, and the mix is placed directly in the freezing chamber. The lid 28 may then be closed, closing the switch 54 and placing the paddle in driving connection with the motor 12, the gearing of the motor and the belt drives being such that the motor when energized rotates the paddle at about 30 rpm, i.e. the wall of the freezing container is scraped about once per second. The paddle not only scrapes the frozen confection from the wall of the container as it forms, but ensures circulation of the mix in the container. If the paddle has more or less blades, its rate of rotation may be changed to maintain roughly the same scraping rate, which is found to give good results. If aeration of the mix is required, one or both of the valves 90 may be opened.

When the switch 80 is turned to ICE CREAM, it completes a circuit to drive and compressor relays CR1 and CR3 which in turn close the correspondingly identified contacts to complete circuits to the motor 12 and the compressor 4, thus starting the paddle and the fan which cools the condenser coil 14, as well as starting refrigeration of the freezing container 68. Thermal contact between the container 68, if used, and the evaporator is improved by condensation occurring between the two, and the container or the disc 92 may be wetted externally before insertion to improve this contact. As the walls of the evaporator are cooled, moisture on the outside of the container or beneath the disc freezes and locks the container or disc in plate without any mechanical aids being required. Sprinkling a pinch of salt into the bottom of the freezing chamber before inserting the container or disc assists in freeing the container after completion of the freezing operation, as will be described further below.

As freezing of the mix proceeds, its viscosity gradually increases, thus increasing the load on the motor 12 and in turn increasing the current drawn by it, until when the ice-cream reaches a proper consistency the current sensing relay CR2 is tripped, thus opening the normally closed contacts CR2 and de-energizing the relays CR1 and CR3, in turn turning off the compressor and drive motor and completing a circuit through a warning buzzer B to indicate that the ice-cream is ready. In order to release the contents of the freezing chamber once the lid 28 has been opened (which stops the buzzer by opening the switch 54), the switch 80 may be turned to DEFROST which energizes a heating element 82 beneath the evaporator or activates some other known form of defrosting means. Excessive heating is prevented by a thermal relay 84 adjacent the evaporator, which senses the evaporator temperature and energizes relay CR4 to disconnect the heater if necessary. The placing of a small quantity of salt in the bottom of the evaporator as previously discussed assists release of the frozen confection by lowering the freezing point of the moisture beneath the disc or the container bottom, and it will be understood that the problem of releasing the contents of the freezing chamber is overcome both without substantial sacrifice of thermal conduction between the evaporator and the mixture and without a complex two part evaporator structure.

If it is desired to freeze water-ices in the unit, the sensing performed by the current relay CR2 is not satisfactory. When the switch 80 is turned to the WATER ICE position, a timer T is switched in to replace the function of the relay CR2, the operation of the unit being otherwise the same.

The provision of the defrost facility also renders the unit suitable for use as a yogurt maker since the thermal cut out 84 can be used to control the heater 82 to keep the container 68 at a suitable temperature for yogurt making. When the switch 80 is turned to YOGURT, a yogurt timer YT is started which switches on latching contacts YT4 across the YOGURT contacts on switch 80, contacts YT3 switching on the heater 82, and contacts YT1 switching on the drive motor 10, so that milk and yogurt culture placed in the container 68 are gently warmed and stirred for a period set by the timer.

In a variant of the embodiment described, the fan 12 is omitted, and appropriate hose connections are made to a chamber containing the coil 14, so that it may be water cooled by connection to a domestic cold water supply. This enables the refrigerator unit to operate at a somewhat greater rate and thus decrease the time required to freeze a given quantity of ice-cream; with air cooling, and an effective freezing chamber capacity of two liters, the freezing time is typically about three minutes.

The current relay CR2 may be replaced by a thermal cutout placed adjacent the motor 10 to sense temperature rise therein as its loading increases. Either arrangement is effective to shut off the motor and the compressor in response to the mix in the freezing vessel reaching a desired consistency, as well as providing protection for the motor.

What I claim is:

1. Apparatus for preparing ice-cream and other frozen confections comprising an integral refrigeration unit, a vertical cylindrical freezing chamber, paddle means removably located for rotation within the freezing chamber about its vertical axis, and a motor rotating the paddle means, wherein a removable disc-shaped support for the frozen confection is provided resting on the bottom of the freezing chamber and locked thereto during operation of the refrigeration unit by freezing of moisture between the support and the chamber whereby the paddle means rotate relative both to the chamber and the support, wherein selectively operable freezing and defrosting elements are in thermal contact with the freezing chamber whereby the confection may be frozen and thereafter the frozen moisture locking the support to the chamber may be melted to release the support, and wherein means are provided to enable the support and the paddle means to be lifted from the freezing chamber as a unit.

2. Apparatus according to claim 1, wherein the means to allow the support and the paddle means to be lifted as a unit is an axial pivotal connection between the paddle unit and the support.

3. Apparatus according to claim 1, wherein the means to allow the support and the paddle means to be lifted as a unit is a side wall of a cylindrical container fitting snugly within the freezing chamber and of which the support forms the bottom end.

4. Apparatus according to claim 1, wherein said defrosting element is a thermostatically controlled heater, and means are provided to activate said heater and the motor for the paddle means independently of the refrigeration unit, whereby to render the apparatus suitable for yogurt making.

5. Apparatus according to claim 1, wherein the paddle means is provided with at least one air passage extending from an entrance above the maximum intended level of frozen confection within the freezing chamber to an exit adjacent the support in a zone of the paddle subject to cavitational forces on rotation of the latter, whereby air is drawn into the confection during freezing.

6. Apparatus according to claim 1, including a lid closing over the freezing chamber, the lid including means establishing on closure of the lid a driving connection through the lid between the motor and the paddle means, wherein the motor and the components of the refrigeration unit other than the evaporator are housed alongside the freezing chamber in separate compartments defined by a body of the apparatus.

7. Apparatus according to claim 1, wherein the freezing chamber forms the inner vessel of an evaporator comprising concentric inner and outer cylindrical vessels, the freezing element is an evaporator tube forming part of the refrigeration unit and coiled between the vessels without metallurgical bonds to the inner vessel, the inner vessel is of stainless steel, and a heat exchange liquid fills the remaining space between the vessels and assures thermal conduction between the tube and the inner vessel.

8. Apparatus according to claim 7, wherein the heat exchange liquid is a mixture of propylene glycol and water having a freezing point selected to provide a thermal buffer during operation of the apparatus.

9. Apparatus according to claim 1, the integral refrigeration unit comprising a compressor unit, a condenser and an evaporator, the evaporator surrounding freezing chamber, and further including a common housing in which the condenser and the compressor are located in separate compartments on different sides of the freezing chamber.

10. In apparatus for preparing ice-cream and other frozen confections comprising an integral refrigeration unit including a vertical cylindrical evaporator, a cylindrical freezing container removably lockable against rotation within the evaporator, paddle means removably located for rotation relative to the freezing container about a vertical axis, and a motor rotating the paddle means, the improvement wherein no mechanical locking of the container within the evaporator is provided but the container is locked to the evaporator by frozen moisture therebetween during a freezing cycle, the clearances between the container and the evaporator being small enough for the former to be locked by frozen moisture, when the apparatus is operated, and wherein selectively operable defrosting means are associated with the evaporator whereby such frozen moisture may be melted to release the container.

11. Apparatus according to claim 10, wherein said defrosting means is a thermostatically controlled heater, and means are provided to activate said heater and the motor drive means for the paddle means independently of the refrigeration unit, whereby to render the apparatus suitable for yogurt making.

* * * * *